US005941285A

United States Patent [19]
Cant

[11] Patent Number: 5,941,285
[45] Date of Patent: Aug. 24, 1999

[54] LINING MATERIAL

[75] Inventor: Samuel Alfred Cant, North Baldwin, Australia

[73] Assignee: Richard Samuel Cant, Nth Balwyn, Australia

[21] Appl. No.: 08/419,666

[22] Filed: Apr. 11, 1995

[30] Foreign Application Priority Data

Apr. 11, 1994 [AU] Australia ................................ PM4991

[51] Int. Cl.[6] ...................................................... F16L 11/00

[52] U.S. Cl. ............................ 138/124; 138/123; 138/98; 138/97; 264/36; 156/287

[58] Field of Search ................................ 138/98, 97, 124, 138/123; 264/269, 36; 156/287, 294; 405/150

[56] References Cited

U.S. PATENT DOCUMENTS

| | | | |
|---|---|---|---|
| 4,284,507 | 8/1981 | Beane | 210/435 |
| 4,322,232 | 3/1982 | Beane | 55/360 |
| 4,576,205 | 3/1986 | Morinaga et al. | 138/98 |
| 4,600,615 | 7/1986 | Hyodo et al. | 138/97 X |
| 4,681,783 | 7/1987 | Hyodo et al. | 138/98 X |
| 4,714,095 | 12/1987 | Muller et al. | 138/97 X |
| 4,723,579 | 2/1988 | Hyodo et al. | 138/124 |
| 4,877,665 | 10/1989 | Higuchi et al. | 138/98 X |
| 4,972,880 | 11/1990 | Strand | 138/98 |
| 4,976,290 | 12/1990 | Gelin et al. | 138/98 X |
| 5,010,440 | 4/1991 | Endo | 138/98 X |
| 5,077,107 | 12/1991 | Kaneda et al. | 138/98 X |
| 5,186,987 | 2/1993 | Imoto et al. | 138/98 X |
| 5,334,429 | 8/1994 | Imoto et al. | 138/98 X |
| 5,535,786 | 7/1996 | Makela et al. | 138/98 |

FOREIGN PATENT DOCUMENTS

| | | |
|---|---|---|
| 528797 | 5/1979 | Australia . |

*Primary Examiner*—Patrick F. Brinson
*Attorney, Agent, or Firm*—Quarles & Brady

[57] ABSTRACT

The present invention provides:

a lining material comprising a flexible fabric tube which is a circularly knitted fabric comprising a ground and a plurality of tufts of fabric projecting from the ground on the inside thereof, and a flexible sleeve within the tube, the flexible sleeve being substantially impervious to at least one of a gas and a liquid and being capable of being inflated in use to generally radially outwardly bear on the tube to force the tube in use into general conformity with an orifice.

9 Claims, No Drawings

LINING MATERIAL

FIELD OF THE INVENTION

This invention relates to lining of orifices and materials for use in so doing.

BACKGROUND TO THE INVENTION

Pipe which is buried in the ground is likely to deteriorate both from the inside and outside when fluids such as aqueous materials are carried on the inside and water and/or solutions can flow over the outside.

Above ground pipes can also deteriorate due to external factors and internal factors.

A typical example of the above is sewer piping and in this case there is the additional hazard of ground movement which may crack or even crush the pipe. Other examples include petroleum pipelines and pneumatic transport conduits.

Within Australia and in other countries, there are many kilometers of sewer pipe which has been laid in the ground in excess of 20 years which is presently showing considerable deterioration.

Of course, it is always possible to dig up roads and soil and replace the pipe completely but to do so is quite expensive.

The present invention seeks to provide a lining material and a method for lining pipes in situ.

While the present invention has a particular application to sewer pipes, there are many other pipes to which the present invention can be applied.

However, the lining material of the present invention is not restricted to lining pipes in situ and may be applied to lining orifices of natural or man-made origin such as cavities or bores in pre-existing substrate.

Examples of such orifices include holes drilled through soil or rock such as under roads and naturally occurring wells or sinks. Other examples of such orifices include core holes, well drilling, and in use in lining of conduits of natural or man-made origin.

SUMMARY OF THE INVENTION

The present invention provides:

a lining material comprising a flexible fabric tube which is a circularly knitted fabric comprising a ground and a plurality of tufts of fabric projecting from the ground on the inside thereof, and a flexible sleeve within the tube, the flexible sleeve being substantially impervious to at least one of a gas and a liquid and being capable of being inflated in use to generally radially outwardly bear on the tube to force the tube in use into general conformity with an orifice.

The present invention also provides:

a method of lining an orifice comprising taking a flexible fabric tube which is a circularly knitted fabric comprising a ground and a plurality of tufts of fabric projecting from the ground on the inside thereof, locating a flexible sleeve within the tube, the flexible sleeve being substantially impervious to at least one of a gas and a liquid, impregnating at least a substantial proportion of the tube and at least a substantial proportion of the tufts with a settable resin or settable cementatious material, locating the tube and the sleeve within an orifice to be lined, inflating the sleeve with a gas or a liquid to cause the tube to closely conform to the interior of the orifice to be lined, and allowing the resin or cementatious material to set whereby to form a liner for the orifice.

PREFERRED ASPECTS TO THE INVENTION

The use of a resin is preferred over the use of a cementatious material.

The invention is preferably applied to the lining of pipes. The sleeve can be located within the tube either before or after the impregnation of the tube with the resin although the former is preferred.

The sleeve may be located within the tube before or after the location of the tube within the pipe.

The sleeve is preferably formed of a vinyl or elastic material.

The tube is preferably of a length to extend between adjacent manhole covers associated with the pipe. That length will commonly be up to 100 meters or more. The length of the sleeve should be appropriate to the length of the tube but some additional length may be desirable to facilitate sealing one end of the sleeve and utilising the other end for inflation purposes.

In addition to the sleeve previously mentioned, hereinafter called "the first sleeve" there may be a second sleeve located on the outside of the tube.

The second sleeve may be itself independent of the tube but may be a coating on the outside of the tube.

The first sleeve might also be a coating applied to the inside of the tube but this is not preferred.

That second sleeve and the first sleeve are preferably located with respect to the tube before the impregnation with the resin or cementations material as the first sleeve and the second sleeve can facilitate the application of resin or cementatious material. In this last respect, resin or cementatious material may be introduced at one end between the first sleeve and the second sleeve and then pushed towards the other end by a roller or preferably two rollers which nip the lining material.

It is to be noted that it is desirable that the second sleeve be transparent or at least translucent as this will enable a sighting of the extent to which the resin or cementatious material has wet the tube. If there is insufficient wetting, manipulation may be done to spread the resin or cementatious material.

The method of the present invention may be utilised to repair short lengths of pipe or relatively long lengths of pipe.

The resin may be any suitable material but some suitable materials include polyurethanes and epoxy resins.

The resin is preferably a cold setting or thermo-setting resin and may be aided in setting by the use of an appropriate catalyst or cross-linking material.

A setting accelerator is preferably used so as to reduce setting time to a commercially acceptable time.

The tube may be pre-impregnated with a component of a settable resin mixture to which another component may be added at time of use.

The present invention also provides a lining material comprising the above tube with the above sleeve located therewithin.

In a preferred aspect, the tube is located between a first sleeve and a second sleeve.

The present invention also provides an orifice, particularly a pipe, lined with the above tube.

A suitable material for the tube is that shown in Australian Patent Specification No. 528797.

The pore sizes shown therein are particularly suitable for retention of resin and promotes the even distribution of the resin into the tufts by capillary action.

In some instances it may be desirable that the tube is made of a High Tensile material such as Kevlar or high temperature fibre such as Nomex.

The diameter of the tube and sleeve should be appropriate to suit the orifice, such as a pipe, which is to be lined.

The tufts of the tube are preferably located on the inside.

In one instance, two or more such tubes were used; one inside the other and, in the case of two tubes, preferably with the tufts of the tubes adjacent one another.

The tuft length will generally be 3 mm or greater. Tuft lengths of 10 mm or more are particularly desirable.

The ground thickness will generally be 0.25 mm or greater. A ground thickness of 3 mm or greater is particularly preferred.

Specific embodiments in accordance with this invention will now be described by way of non-limiting examples.

DETAILED DESCRIPTION OF SPECIFIC EMBODIMENTS

Example 1

A length of tubing was taken of about 100 meters length and about 200 mm in diameter.

The tubing was a circularly knitted tube comprising a ground and having an internal pile surface.

More particularly, the internal pile surface was of terry towel tufts and was of the general type of material shown in Australian Patent Specification No. 528797.

Within the tube was a vinyl liner sleeve of about the same internal diameter as the tube of a length about 1.5 meters longer than the length of the tube such that sleeve projected from both ends of the tube.

The resulting composite product was then passed through a bath containing a thermo-setting resin with catalyst and accelerator and thereafter the resin impregnated product was passed between nip rolls so as to force the resin through the tube and thoroughly wet it.

The wetted composite was then folded along its length approxitmately into the shape of a U to reduce the apparent cross-sectional size and it was passed into a pipe to be lined.

The manner of passing it into the pipe to be lined is not material but one method includes attaching a rope to one end and drawing it through the pipe.

When the wetted composite was properly located within the pipe one end of the sleeve was closed, such as with a clamp, thereafter air, steam or water was passed under low pressure into the other end of the sleeve so as to expand the sleeve and cause the wettted composite to take up an approximately cylindrical form and to press the tube into intimate contact with the pipe.

Air, steam or water pressure was maintained for about an hour or until the resin had set.

The sleeve was thereafter deflated and removed. This removal is not essential.

Thereafter the ends of the tube were trimmed as desired.

Example II

Example 1 was repeated excepting that within the tube was a first sleeve and on the outside of the tube was a second sleeve.

In this instance, the resin was introduced between the first sleeve and the second sleeve and was moved along the length of the tube between the sleeves by means of nip rolls.

The above methods and products have been found to produce an excellent lining to an orifice, such as a pipe, which will give many years of service.

In particular, the tube is strong and seamless having no sewn joints and is easily wet out. Further, the tube has some stretch in it both longitudinally and circumferentially. The circumferential stretch is of particular value in coming into conformity of shape.

For very large orifices or very large pipes, it may be necessary to take two or more such tubes, slit them longitudinally, and sew them together longitudinally to obtain the required diameter.

The claims, illustrations, photographs and drawings form part of the disclosure of this specification as does the description, claims, illustrations, photographs and drawings of any associated provisional or parent specification or of any priority document all of which are imported hereinto as part of the record thereof.

Finally it is to be understood that various alterations, modifications and/or additions may be incorporated into the various constructions and arrangements or parts without departing from the spirit and ambit of the invention.

I claim:

1. A lining material comprising a flexible fabric tube which is a circularly knitted fabric comprising a ground and a plurality of tufts of fabric projecting from the ground on the inside thereof, and a flexible sleeve within the tube, the flexible sleeve being substantially impervious to at least one of a gas and a liquid and being capable of being inflated in use to generally radially outwardly bear on the tube to force the tube in use into general conformity with an orifice.

2. A lining material as claimed in claim 1, wherein the tube is comprised of a yarn which is knit into stitches defining said ground and stitches defining said tufts which are loop pile tufts extending from the ground.

3. A lining material as claimed in claim 1, wherein the tufts extend from the ground to a height of not less than 3 mm.

4. A lining material as claimed in claim 2, wherein the ground has a thickness of not less than 0.25 mm.

5. A lining material as claimed in claim 1, wherein, in addition to said flexible sleeve, hereinafter called "the first sleeve", there is a second flexible sleeve located over the outside of the tube.

6. A lining material as claim in claim 1, wherein the tube is comprised of a High Tensile strength yarn.

7. A lining material as claimed in claim 1, wherein the tube is pre-impregnated with a component of a settable resin mixture to which another component of said settable resin mixture may be added at time of use.

8. A method of lining an orifice comprising taking a flexible fabric tube which is a circularly knitted fabric comprising a ground and a plurality of tufts of fabric projecting from the ground on the inside thereof, locating a flexible sleeve with the tube, the flexible sleeve being substantially impervious to at least one of a gas and a liquid, impregnating at least a substantial proportion of the tube and at least a substantial proportion of the tufts with one of a settable resin and a settable cementations material, locating the tube and the sleeve within an orifice to be lined, inflating the sleeve with one of a gas and a liquid to cause the tube to closely conform to the interior of the orifice to be lined, and allowing said one of a settable resin and a settable cementations material to set whereby to form a liner for the orifice.

9. A lining material comprising a flexible fabric tube which is a circularly knitted fabric comprising a ground and a plurality of tufts of fabric projecting from the ground on the inside thereof, a first flexible sleeve within the tube, the first flexible sleeve being substantially impervious to at least one of a gas and a liquid and being capable of being inflated in use to generally radially outwardly bear on the tube to force the tube in use into general conformity with an orifice, and a second flexible sleeve located over the outside of the tube, the second flexible sleeve being transparent or translucent to an extent that in use wetting of the tube by a settable resin can be observed.

* * * * *